United States Patent

[11] 3,604,795

[72] Inventor Robert P. Crandall
 Rochester, N.Y.
[21] Appl. No. 730,316
[22] Filed May 20, 1968
[45] Patented Sept. 14, 1971
[73] Assignee Eastman Kodak Company
 Rochester, N.Y.

[54] IMAGE PROJECTION SYSTEM
 10 Claims, 12 Drawing Figs.
[52] U.S. Cl..................................................... 353/76,
 353/77, 353/99, 355/56, 355/57
[51] Int. Cl....................................................... G03b 21/22,
 G03b 21/28, G03b 27/34
[50] Field of Search............................................ 353/76, 77,
 99; 355/55, 56, 57, 58, 59, 60

[56] References Cited
UNITED STATES PATENTS
2,204,709 6/1940 Straubel et al................ 353/76
2,746,344 5/1956 Pratt et al..................... 353/76
3,181,416 5/1965 Halberg........................ 355/56 X Primary Examiner—Leonard Forman
Assistant Examiner—Steven L. Stephan
Attorneys—Robert W. Hampton and R. Lewis Gable ABSTRACT: Apparatus is disclosed for projecting an image onto a display surface with varying degrees of magnification and having the capability of selectively projecting various portions of the image. This apparatus is capable of incorporating a plurality of different lenses and illustratively includes a reflective surface, which is movably mounted to increase or decrease the long conjugate distance between the lens and the display surface. The selected lens is inserted within the apparatus at its given focal distance from the transparency to be projected and is manipulated by a follow focus mechanism to maintain the projected image in focus as the reflected surface is being moved.

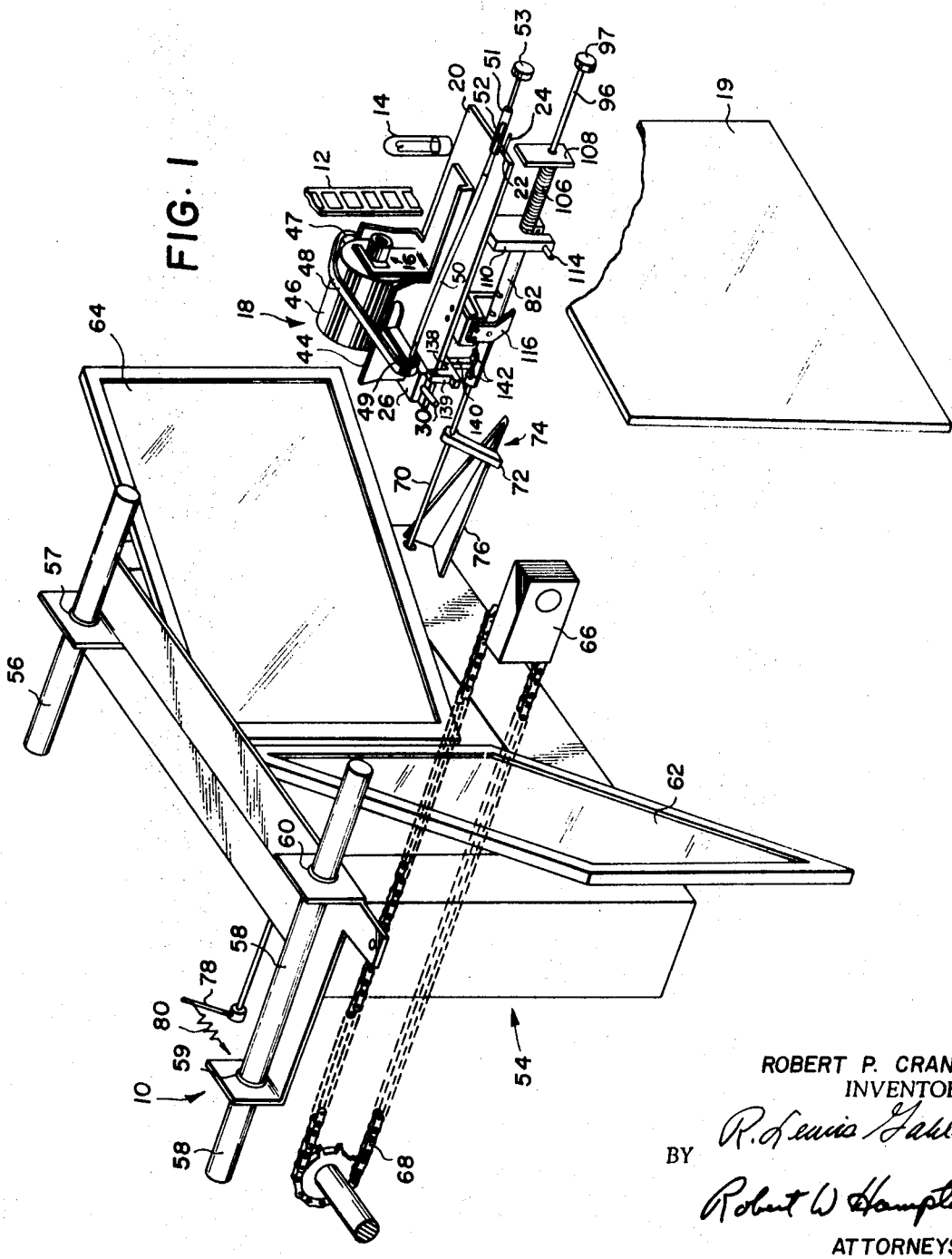

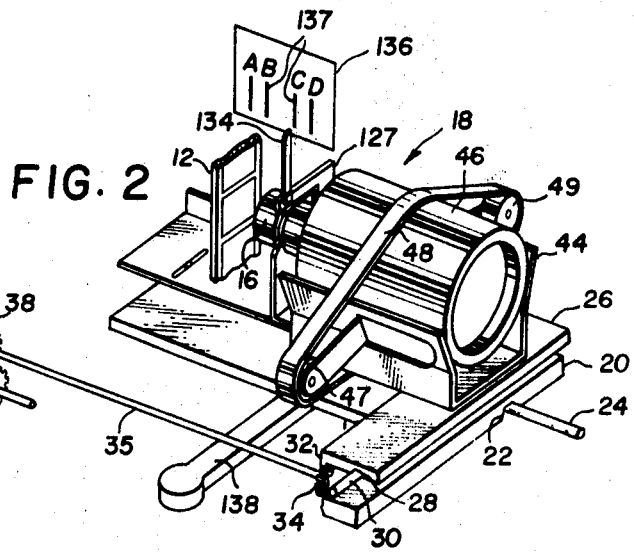

ROBERT P. CRANDALL
INVENTOR.

BY R. Lewis Gable

Robert W. Hampton
ATTORNEYS

IMAGE PROJECTION SYSTEM

CROSS-REFERENCES TO RELATED APPLICATIONS

Reference is made to commonly assigned copending U.S. Pat. application Ser. No. 730,443, entitled "Image Projection System," filed May 20, 1968 now U.S. Pat. No. 3,482,901 in the name of Charles J. Melech.

BACKGROUND OF THE INVENTION

1. Field of the Invention

This invention relates to image projection systems and more particularly to such systems for providing varying degrees of magnification of a projected image and capable of accepting various lenses to effect the desired magnification and projection of selected portions of the image.

The image projection system of the present invention is particularly adapted for use with microfilm viewers or readers in which a selected image from an elongated strip of film may be chosen and projected with varying degrees of magnification. Though this invention is described with regard to a microfilm reader, it is understood that the system of the present invention could be used with equal facility and advantage in other image projection systems, and therefore the following description is provided for illustrative purposes only.

2. Description of the Prior Art

One of the problems encountered in the projection of selected images from a strip of microfilm is the requirement of flexibility in projecting images of varying size and varying formats. It may be understood that documents of different sizes and formats may be photographed and the images recorded on a strip of microfilm, which images are to be projected and examined by the operator of a microfilm reader. Typically, it may be necessary to reorientate the images so that the indicia is upright with respect to the observer and to magnify particular portions of an image so that the viewer may more readily examine the stored information. Projection systems of the prior art as described in U.S. Pat. Nos. 2,746,344 and 3,181,416 provide for varying degrees of magnification by providing a pair of mirrors which are movable mounted upon an assembly between a lens and a display screen. A cam is associated with the mirror assembly to adjust the position of a lens carriage upon which a lens is movably mounted. As the long conjugate distance between the lens and the display screen is increased by moving the mirror assembly, a corresponding readjustment of the position of the lens carriage and lens is made to maintain the projected image in focus upon the display screen. The degree of magnification is dependent upon the long conjugate distance between the lens and the focal surface. There are practical limits to the size of such projection systems, which in turn limit the degree of magnification that may be achieved by moving a pair of mirrors. Thus, it is desirable to incorporate a plurality of lenses within the projection system in order to achieve varying degrees of magnification. When a high degree of magnification is desired, a lens with a relatively short focal length would be inserted within the projection system and the projected image would be correspondingly magnified. Within U.S. Pat. No. 3,181,416, a projection system is disclosed with a pair of lens that may be alternatively disposed in alignment to provide varying degrees of magnification. A plurality of cams are connected mechanically to a carriage supporting the mirror. The pair of lenses are disposed upon a pivotably mounted member so that either lens may be inserted within the projection path. A cam follower is associated with the pivotably mounted member to be engaged with either of the two cams dependent upon which lens is disposed within the projection system.

It would be desirable to incorporate one of a larger number of lenses easily within the projection system to provide greater flexibility than the projection systems of the prior art. Further, it would be desired to use a single cam member and to provide a simple engagement with the cam member. The use of a plurality of cam members associated with the mirror carriage, require that the cam follower be positively engaged with each of the cam members. It would be desirable to simplify the mechanical connection between the cam member and the assembly for mounting the plurality of lenses. In addition, the lens-mounting assembly should also be adjustable in a direction transverse to the length of microfilm so that selected portions of the image may be projected onto the screen.

In order to change the degree of magnification, the reflective surfaces or mirrors are moved to decrease or increase the long conjugate distance between the lens and the display screen. As the position of the mirrors is being changed, it is necessary to impart a corresponding change in the position of the lens to maintain the projected image in focus upon the display screen. Most lenses require a follow focus correction which is a nonlinear function of the movement of the mirrors. For shorter long conjugate focal distances, it is necessary to impart a great degree of follow focus correction to the lens than for greater long conjugate focal distances. Nonlinear cam surfaces could be used to provide the required nonlinear correction to the position of the lens. However, such nonlinear surfaces would be difficult and expensive to machine, and it would be desirable to provide rather simple cam surfaces to impart the required follow focus adjustment to the lens.

SUMMARY OF THE INVENTION

It is therefore an object of this invention to provide a new and improved image projection system capable of easily incorporating a plurality of lenses to effect various degrees of magnification.

Another object of this invention is to provide a new and improved image projection system capable of effecting a follow focus correction for each of a plurality of lenses to be inserted within the image projection system.

A still further object of this invention is to provide a new and improved image projection system capable of incorporating a plurality of lenses wherein each of the lenses may be easily adjusted along various dimensions to achieve a fine focus of the projected image and also to selectively view various portions of an image.

A further object of this invention is to provide a new and improved image projection system in which the follow focus adjustment of the lens is effected by a relatively simple cam surface.

These and other objects are accomplished in accordance with the teachings of this invention by providing an image projection system including a lens disposed upon an assembly adjustable along the path of the projected image, a reflecting surface disposed on a movable carriage between the lens and a focal surface, a cam associated with the mirror carriage and a suitable linkage disposed between the cam and the lens carriage for providing an appropriate adjustment in the position of the lens to thereby maintain the projected image in focus upon the focal surface. In one particular illustrative embodiment, the linkage includes a lever rotatably mounted upon a rod and flexibly biased to follow the movement of the cam. It is a significant aspect of a preferred embodiment of this invention that the cam connected to the mirror carriage presents a simple, linear surface which is skewed with respect to the rod to thereby provide a nonlinear rotation to the rod. In turn, the rod is connected to a lens-positioning cam which has a plurality of grooves or cam surfaces therein corresponding to each of the plurality of lenses. The lens carriage is selectively engaged in the appropriate groove which translates the nonlinear rotational motion imparted thereto into a nonlinear motion along the path of the projected image to the lens to thereby compensate for the nonlinear optical characteristics of the lens.

In addition, the lens and lens carriage may be adjusted along the path of the projected image by a fine focus control. More specifically, a shaft may be used for imparting a rotational motion from a control knob to a bearing disposed to exert a force upon a surface of the lens-positioning cam. The shaft may be threadably received by the bearing which is held in a nonrotating relationship with respect to the lens positioning cam. Thus, a motion along the path of the projected image may be imparted to the lens to achieve a fine focusing of the projected image without interfering with the angular position of the lens positioning cam. In addition, the bearing may be so configured to allow the lens positioning cam to be disengaged from the lens carriage to thereby permit a new lens to be mounted upon the carriage and the carriage to be in turn engaged with another groove of the lens-positioning cam. Further, a suitable brake may be applied to the shaft connected with the control knob to prevent the rotation imparted by the lens-positioning cam to the bearing to effect the angular position of the fine focus control.

It is a significant aspect of a preferred embodiment of this invention, that the grooves of the lens-positioning cam be placed to determine the correct placement of the corresponding lens. More specifically, each of the plurality of lenses to be inserted within the image projection system of this invention would normally have a different focal length which would determine the placement of the lens with regard to a strip of photographic film. Thus, when the lens carriage is engaged within one of the grooves of the lens-positioning cam, the inserted lens is substantially disposed at its focal length with respect to the strip of film. In addition, the configuration of each of the grooves is so determined to provide the correct displacement along the path of the projected image to the particular lens mounted upon the lens carriage.

BRIEF DESCRIPTION OF THE DRAWINGS

These and other objects and features of the present invention will become more apparent when considered in view of the following description and drawings in which:

FIG. 1 is an orthogonal view of an image projection system in accordance with the teachings of this invention;

FIG. 2 is an orthogonal view of the lens and lens carriage assembly which is incorporated within the image projection system of FIG. 1;

FIGS. 3A and 3B are enlarged views of the lens support assembly which may be incorporated within the image projection system of FIG. 1;

FIGS. 4A and 4B are enlarged views of the cam follower assembly which is incorporated within the image projection system shown in FIG. 1;

DESCRIPTION OF THE PREFERRED EMBODIMENT

Figure 5:
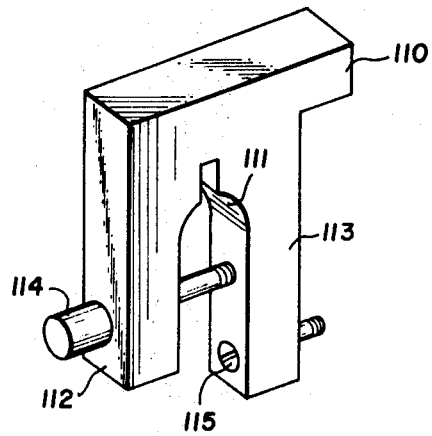
FIG. 5 is an enlarged, orthogonal view of the brake incorporated within the image projection system of FIG. 1.

Referring now to the drawings and in particular to FIG. 1, there is shown a variable magnification image projection system 10 including a source 14 of radiation for illuminating a selected frame of a filmstrip 12 and a lens 16 for focusing the illuminated frame onto a display surface or screen 19. The lens 16 is mounted upon a lens carriage assembly 18, which includes a carriage 20 movably mounted along a direction parallel to the projected path of the image, and a second carriage 26 movably supported along a linear path parallel to the width of the filmstrip 12. More specifically, the carriage 20 is mounted to slide upon a rod-shaped way 24 which fits into a V-shaped slot 22 of the carriage 20. Similarly, the carriage 26 is mounted to freely move upon a rod-shaped way 30 which fits within a slot 28 (see FIG. 2) of the carriage 26.

As shown more clearly in FIG. 2, the carriage 26 may be selectively moved along a path parallel to the width of the filmstrip 12, by a knob 42, which is connected to an elongated pinion gear 40. In turn, the pinion gear 40 meshes with a gear 38 which is connected through a shaft 35 to a pinion gear 34. The use of the elongated pinion gear 40 allows the lens carriage assembly 18 to be moved axially along the path of the projected image without disengaging the gear 38 from the pinion gear 40. The pinion gear 34 meshes with the teeth of a rack 32 attached to the carriage 26 to thereby impart a linear motion to the carriage 26 along a direction parallel to the width of the filmstrip 12.

A prism assembly 46 is rotatably mounted upon a support bracket 44, which is in turn fixedly supported upon the carriage 26. The prism assembly 46 may in one illustrative embodiment take the form of a "Dove" prism and be aligned in the path of the projected image. Such a prism assembly 46 would be rotated to in turn rotate the projected image. A belt 48 is disposed in a frictional relationship about the prism assembly 46 and also about a pair of pulleys 47 and 49 rotatably mounted upon the support bracket 44. As more clearly shown in FIG. 1, the pulley 49 is connected by a flexible shaft 50 to an adjusting knob 53. In order to allow for the movement of the carriage 20 along the path of the projectee image, the flexible shaft 50 is connected to the knob 53 through a slotted member 51. More specifically, the flexible shaft 50 is slidably connected by a pin 52 in a slidable but nonrotational relationship to the member 51. As the knob 53 is rotated, a corresponding rotational motion will be imparted to the prism assembly 46 thereby rotating the projected image. It may be understood that certain documents such as computer readout have type along the length of the document and will be photographed so that the long dimension of the document is disposed along the length of the strip 12. As a result, it will be necessary to rotate the image of such a document approximately 90° so that the type may be displayed upon the screen of this device in a manner that may be most easily read by the viewer.

The lens 16 is supported upon the carriage 26 by a mounting plate 127. As shown more clearly in FIGS. 3A and 3B, the lens 16 is removably secured to the mounting plate 127 by a spring clip 128, which is itself secured to the plate 127 by a plurality of fasteners 126. The lens 16 has a groove 132 disposed about its periphery. A lens flange 131 extends normally from the groove 132 and serves as a seating surface against which the plate 127 is biased to thereby mount the lens 16 in an aligned relationship with the filmstrip 12. The groove 132 of the lens 16 is disposed within a V-shaped slot 129 of the plate 127. The spring clip 128 has a pair of formed ends 130 which flexibly fit over the center of the lens 16 to thereby secure the lens 16 within the slot 129. Further, the ends 130 are flexibly disposed against a cam surface 133 associated with the groove 132 so that the lens 16 is directed to the left (as shown in FIG. 3B) to thereby seat the flange 131 against the plate 127. Thus, there has been shown in FIGS. 3A and 3B an assembly into which a plurality of lenses may be interchangeably disposed.

With regard to FIG. 1, a pair of mirrors 62 and 64 are disposed in the path of the projected image between the lens 16 and the display surface or screen 19. In order to vary the long conjugate distance between the lens 16 and the display surface 19 and therefore the magnification of the projected image, the mirrors 62 and 64 are disposed upon a mirror carriage assembly 54, which is movably mounted upon a pair of guide rods 56 and 58 in a direction parallel to the incident path of the projected image from the lens 16. More specifically, the mirror carriage assembly 54 is suspended from the guide rod 56 by a single bearing 57 and from the guide rod 58 by a pair of bearings 59 and 60. The mirrors 62 and 64 are moved with a linear, bidirectional motion along the guide rods 56 and 58 by a drive motor 66 which is connected to the carriage assembly 54 by a chain or belt 68.

As the pair of mirrors 62 and 64 are moved to vary the long conjugate distance, it is necessary to impart a corresponding adjustment to the placement of the lens 16 to maintain the projected image in focus on the screen 19. In order to maintain the projected image in focus, a cam 74 is fixedly mounted upon the mirror carriage assembly 54. The cam 74 has a surface or edge 76 which engages a follower lever 72. The lever 72 is fixedly secured to a follow focus rod 70, which is biased in a counterclockwise direction (as shown in FIG. 1) by a lever 78 fixedly secured to the rod 70 and a spring 80. As seen in FIG. 1, a clockwise rotational motion is imparted to the lever 72 as the mirror carriage assembly 54 is moved towards the lens 16, and a counterclockwise motion is imparted to the lever 72 as the carriage 54 is moved away from the lens 16.

Figure 6:
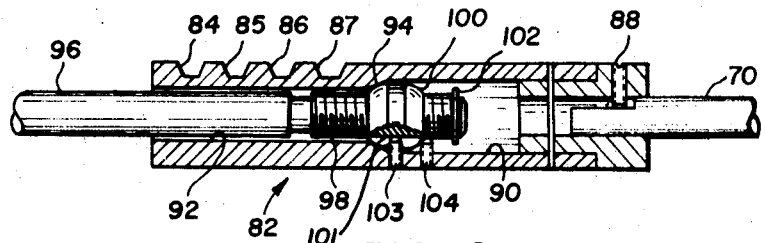
FIG. 6 is a sectional view and FIG. 7 is a plan view of the lens positioning cam incorporated in the image projection system of FIG. 1.
Figure 7:
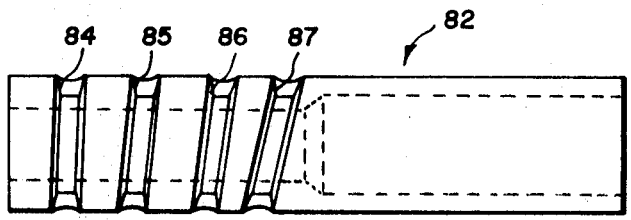

As shown in FIG. 6, the follow focus rod 70 is fixedly connected to a lens-positioning cam 82 by a setscrew 88 so as to thereby impart a rotational motion to the lens-positioning cam 82. With reference to FIGS. 1, and 7, a cam follower assembly 116 is fixedly secured to the lens support assembly 18 and in particular to the carriage 20, and is engageable with each of a plurality of cam grooves at surfaces 84, 85, 86 and 87 disposed within the lens-positioning cam 82. Generally, the lens positioning cam 82 serves to convert the rotational motion imparted thereto by the lever 72 and the follow focus rod 70 into a motion applied to the lens support assembly 18 along the path of the projected image. In particular, the cam grooves 84, 85, 86 and 87 are so configured to impart varying motions to the image support assembly 18 corresponding to the different lenses that may be interchangeably mounted upon the assembly 18. As shown in FIG. 7, cam groove 87 has a greater pitch than the remaining grooves 84, 85 86 and therefore is adapted to take a lens of a longer focal length than the remaining grooves. As will become evident later, it is a significant aspect of this invention that the cam grooves 84, 85, 86 and 87 are so spaced from each other so that when the cam follower assembly 116 is engaged in one of the grooves, the corresponding lens 16 will be disposed at its focal length with respect to the strip 12.

A control knob 97 is provided to impart a fine focus adjustment to the lens 16. More specifically, the knob 97 is connected to a fine focus rod 96, which is in turn connected to the lens position cam 82 to impart a rectilinear motion to the lens-positioning cam 82. As shown in FIG. 6, the fine focus rod 96 has a threaded portion 98 threadably received by a spherically shaped bearing 100. The bearing 100 has a groove 101 disposed parallel to the axis of the bearing 100 for receiving a setscrew 103 to secure the bearing 100 in a fixed, nonrotating relationship with respect to the lens-positioning cam 82. Upon the end of the fine focus rod 96 opposite the knob 97, there is disposed a stop washer 102 to prevent the rod 96 from being rotated out of the bearing 100. The lens-positioning cam 82 includes a centrally orientated bore 90 for receiving the bearing 100 and a bore 92 of a smaller diameter through which the fine focus rod 96 is inserted to be threadably received by the bearing 100. A bearing surface 94 is disposed between the bores 90 and 92 to provide a surface against which the bearing 100 abuts. A setscrew 104 is disposed within the lens-positioning cam 82 to abut the other side of the bearing 100. The surface 94 and the setscrew 104 abut the bearing 100 to impart a rectilinear motion from the fine focus rod 96 to the lens-positioning cam 82. It is particularly noted that the bearing 100 is spherically shaped so that the lens-positioning cam 82 may be depressed downwardly as shown in FIG. 6 or FIG. 1 so as to be disengaged from the cam follower assembly 116 and to allow another lens 16 to be inserted within the image projection system 10.

As explained above, the lens 16 is adjusted to maintain the projected image in focus upon the screen 19 as the mirrors 62 and 64 are moved along the guides 56 and 58 to effect the desired degree of image magnification. More particularly, a rotational motion is imparted through the follow focus rod 70 to the lens-positioning cam 82. In turn, the lens 16 is coupled by the cam follower assembly 116 to one of the cam grooves 84, 85, 86 or 87 of the lens-positioning cam 82. Each of the cam grooves 84, 85, 86 and 87 has a pitch calculated to apply the correct movement to the corresponding lens 16. In addition, the adjusting movement applied to lens 16 is partially dependent upon the rotational movement of the bearing 100 and the lens-positioning cam 82 about the threaded portion 98 of the fine focus rod 96. It may be understood that as the cam 82 is rotated about the threaded portion 98, a rectilinear movement will be imparted through the bearing 100 and the lens-positioning cam 82 to the selected lens 16. Therefore, the pitch of the grooves 84, 85, 86 and 87 is calculated to include the secondary adjustment provided by the threaded portion 98.

With regard to FIGS. 1 and 5, a friction brake 110 is disposed about the fine focus rod 96 to apply a sufficient braking torque to prevent the bearing 100 from rotating the shaft 96 when the follow focus rod 70 rotates the lens-positioning cam 82. The friction brake 110 has a pair of legs 112 and 113 forming a slot 111 therebetween. An adjusting bolt 114 is disposed through the leg 112 to be threadably received by the leg 113. As shown in FIG. 1, the fine focus rod 96 is disposed between the bite of the slot 111 and the adjusting bolt 114. By adjusting the bolt 114, a suitable braking torque may be applied to the fine focus rod 96. A bolt 115 is disposed through the leg 113 to be positioned against a portion of the housing (not shown) of this device to prevent rotation of the friction brake 110. A spring 106 is disposed between the friction brake 110 and a front panel 108 through which the fine focus rod 96 is disposed. The spring 106 exerts an axial force through the friction brake 110 upon the lens-positioning cam 82 to ensure the positive engagement between the threaded portion 98 of the fine focus rod 96 and the bearing 100 and to thereby eliminate any play in the fine focus adjustment when the knob 97 is turned. It may be understood that the fine focus rod 96 is fixed axially with respect to the front panel 108.

With regard to FIGS. 1, 4A and 4B, the cam follower assembly 116 is engageable with one of the grooves 84, 85, 86 and 87 of the lens-positioning cam 82 to translate the rotational motion of the cam 82 to the lens carriage assembly 18. The cam follower assembly 116 includes a support member 118 having a horizontally extending arm 119 secured to the lens carriage assembly 18, and a pair of vertically extending arms 120 and 123. The cam follower assembly 116 includes a canted, flexible member 121 for releasably holding the lens-positioning cam 82 against the arm 120. The flexible member 121 is secured to the support member 118 by suitable fasteners 122. A follower rod 124 is disposed between and fixedly held by the pair of vertically extending arms 120 and 123. As shown in FIGS. 1 and 4A, the follower rod 124 is selectively engaged with one of the grooves 84, 85, 86 or 87 dependent upon the lens 16 inserted within the system. As shown in FIG. 4B, the follower rod 124 is disposed at an angle $\Phi$ with respect to a line normal to the member 121. As shown in FIG. 7, the grooves 84, 85, 86 and 87 are disposed at an increasingly greater pitch with respect to the axis of the lens-positioning cam 82. The rod 124 is disposed with respect to the cam 82 to mesh with the grooves 84, 85, 86 and 87. In particular, the angle $\Phi$ is selected as a compromise of the varying angles (or pitches) of the grooves to be suitably coupled to all of these grooves.

In accordance with the teachings of this invention a plurality of lenses 16 may each be inserted within the spring clip 128 upon lens carriage assembly 18 at a distance from the strip 12 determined by the grooves 84, 85, 86 and 87. As shown most clearly in FIG. 2, a pointer 134 is fixedly secured to the mounting plate 127. A plate 136 is provided for displaying suitably spaced indicia 137 corresponding to the grooves 84, 85 86 and 87. As mentioned above, the grooves 84, 85, 86 and 87 are spaced along the axis of the lens-positioning cam 82 distances corresponding to the focal lengths of the lenses to be inserted within the spring clip 128. Thus, to ensure the engagement of the follower rod 124 with the correct groove and at the same time to ensure the placement of the lens 16 at its focal length with respect to the filmstrip 12, the cam follower assembly 116 is engaged with one of the grooves 84, 85, 86 and 87 corresponding to the inserted lens 16. As shown in FIGS. 1 and 2, the lens-positioning cam 82 may be disengaged from the cam follower assembly 116 by a separator lever 138, which includes a pivoting arm 139 about which the lever is rotated, and a projection 140 having winged portions 142 for abutting against the lens-positioning cam 82. As shown in FIG. 1, the winged portions 142 prevent the projection 140 from being disposed within one of the grooves of the lens-positioning cam 82. By depressing the lever 138, the follower rod 124 is disengaged from one of the grooves 84, 85, 86 and 87 to thereby allow the lens carriage assembly 18 to be rectilinearly slid along the way 24. The assembly 18 and in particular the carriage 20 is slid until the pointer 134 coincides with a particular one of the indicia 137 corresponding to the lens 16 to be inserted within the spring clip 128. A lens 16 so inserted will be matched with its correct cam groove and also disposed at its focal length with respect to the strip 12.

Figure 10:
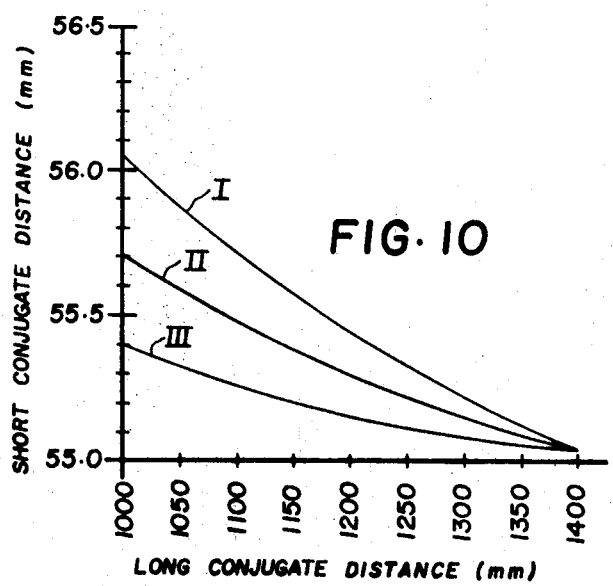
FIG. 10 is a graph showing the required short conjugate distance of lenses to be incorporated within the projection system of FIG. 1 versus the long conjugate distance, which is varied to increase or decrease the magnification of the projected image.

There is shown in FIG. 10 the optical characteristics of several lenses that may be incorporated within the image projection system 10 of this invention. Particular reference is made to the above-identified copending application of Charles J. Melech, which describes a particular objective and associated lens system that may be used with the image projection system 10 described herein. As described above with reference to FIG. 1, an adjustment is made in the position of the lens 16 with regard to the strip 12 to compensate for the movement of the mirrors 62 and 64 and to maintain the projected image in focus upon the display screen 19. The distance between the optical center of the lens 16 and the surface of strip 12 is defined as the short conjugate distance, whereas the distance between the optical center of the lens 16 and the display screen 19 may be defined as the long conjugate distance. FIG. 10 presents a series of curves I, II and III demonstrating the required short conjugate distance to maintain the projected image focused upon a display screen disposed at varying long conjugate distances.

As explained above, the mirrors 62 and 64 may be moved upon the mirror carriage assembly 54 to thereby increase the long conjugate distance of the system. To maintain the projected image in focus, a corresponding change in the short conjugate distance must be made as determined by the curves of FIG. 10. In accordance with the teachings of this invention, the cam 74 affixed to the mirror carriage assembly 54 imparts a rotational motion to the follow focus rod 70 through the lever 72. As the mirror carriage assembly 54 is driven linearly by the motor 66 along a rectilinear path parallel to the rod 70, the cam surface 76 engages various portions of the lever 72 to thereby impart a rotational motion to the lever 72 and the rod 70.

With regard to FIG. 10, it is apparent that the curves are nonlinear and that varying amounts of adjustment must be imparted to the lens 16 depending upon the long conjugate distance of the system. For greater long conjugate distances, smaller amounts of correction are required. As the long conjugate distance decreases, (corresponding to the disposition of the assembly 54 closer to the lens 16), the amount of adjustment to be imparted to the position of the lens 16 increases. A nonlinear follow focus movement could be provided by making the cam surface 76 of a suitable nonlinear configuration, and/or by making the cam surfaces 84, 85, 86 and 87 of the lens-positioning cam 82 with nonlinear pitches. Such operations are difficult and expensive to perform, and in a preferred embodiment of this invention, a nonlinear follow focus movement is achieved by forming the cam surface 76 into a straight edge which is skewed with respect to an axis 75 of the rod 70.

Figure 8:
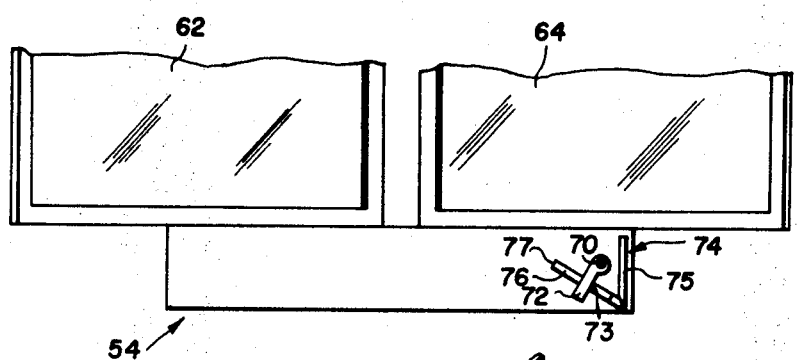
FIGS. 8 and 9 are respectively a side view and an orthogonal view of the carriage assembly upon which the mirrors are mounted, and the cam associated with this carriage assembly.
Figure 9:
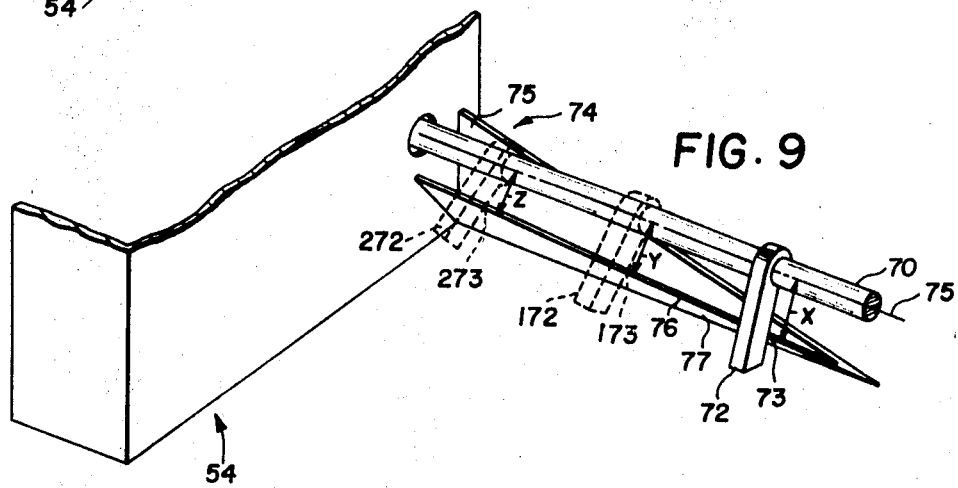

As shown in FIGS. 8 and 9, the lever 72 is brought into contact with the cam surface 76 at a point 73. As a result of the configuration and disposition of the cam surface 76, the distance between the point 73 of contact and the axis 75 changes as the carriage 54 is moved with respect to the lens 16. The point 73 is shown in FIG. 9 to be an X-distance from the axis 75. As the assembly 54 is moved toward the lens 16, the lever 72 assumes a first position 172 (shown in phantom) with a point of contact 173 and then a second position 272 with a corresponding point 273 of contact. As readily seen, the distance Y between the point 173 and the axis 75 is less than the distance X, and the distance Z between the point 273 and the axis 75 is less than the distance Y. As the distance between the point of contact of the lever 72 with cam surface 76 becomes smaller, a greater angular rotation is imparted to the rod 70 for a given, linear movement of the mirror carriage assembly 54. In accordance with the teachings of this invention, the nonlinear movement imparted by the rod 70 through the lens-positioning cam 82 to the lens 16 is calculated to substantially provide the nonlinear, follow focus movement dictated by the curves of FIG. 10. The nonlinear, follow focus movement is determined by the distance between the points 73, 173 and 273, and the axis 75. More specifically, the degree of nonlinearity of the follow focus movement will be increased by increasing the difference between the distances of points of contact and the axis 75 at both ends of the cam surface 76 for a cam 74 of a given length. In other words, the nonlinearity of a cam 74 of fixed length may be increased by increasing the differences between the distance X and distance Z as shown in FIG. 9.

Thus, there has been shown an image projection system capable of projecting an image with variable degrees of magnification while maintaining the image in focus upon the focus surface by the use of a cam member of simple configuration. The system of this invention is capable of incorporating a plurality of lenses each of which is kept in focus while the magnification of the system is changed and which is easily disposed in the system at its focal length from the image to be projected. In addition, the system of this invention provides for a fine focus adjustment of the lens without disturbing the follow focus mechanism, and further allows for the selection of various portions of the image to be projected and for the rotation of the image so that it may be more easily observed.

This invention has been described in detail with reference to a preferred embodiment, but it will be understood that variations and modifications can be effected within the spirit and scope of the invention as described hereinabove and as defined the appended claims.

We claim:

1. An image projection system for projecting an image from an information bearing medium onto a surface including; means for interchangeably incorporating a plurality of lenses, reflecting means disposed to direct the image derived from one of the plurality of lenses onto the surface, means for selectively varying the position of said reflecting means to vary the long conjugate distance between the one lens and said surface, and follow focus means responsive to the position of said reflecting means to vary the position of said support means and said one lens to substantially maintain the image in focus upon the surface, said follow focus means including a first cam member affixed to said reflecting means, a second cam member having a camming surface corresponding to each of the plurality of lenses a lever disposed to follow the motion of said first cam member, and rod means for transferring said motion from said lever to said second cam member.

2. An image projection system as claimed in claim 1, wherein said rod means is flexibly biased to engage said lever with said first cam member.

3. An image projection system as claimed in claim 1, which additionally includes fine focus means associated with said follow focus means for further adjusting the position of the incorporated one of the plurality of lenses to ensure that the image is in focus upon the surface, said fine focus means including a bearing having a threaded portion for imparting rectilinear motion to said camming surfaces of said second cam member and a rotatable member having a threaded portion which is threadably received by said bearing, said bearing having a surface of substantially spherical configuration for allowing said follow focus means to be disengaged from said means for interchangeably incorporating a plurality of lenses.

4. A system for projecting an image from an object onto a focal surface including; a first carriage for interchangeably receiving a plurality of lenses, a second carriage including at least one reflective surface for directing the image onto the focal surface, a cam member secured to said second carriage, said first and second carriages being movably mounted with respect to the object, and a follow focus system responsive to the position of said second carriage for varying the position of said first carriage to maintain the projected image in focus upon the focal surface, said follow focus system including, lens-positioning means cooperably connected to said first carriage and having a camming surface corresponding to each one of the plurality of lenses for positioning the corresponding lens with respect to the object and for controlling the movement of said first carriage when one of the plurality of lenses is incorporated within said system, a lever flexibly biased against said cam member, and a follow focus rod to which said lever is secured, said follow focus rod being connected to said lens-positioning means to impart rotational motion to said lens-positioning means.

5. An image projection system for projecting an image from an object onto a focal surface, comprising support means for interchangeably incorporating a selected lens from a plurality of lenses, reflecting means for directing the image onto the focal surface, means for selectively varying the position of said reflecting means to vary the long conjugate distance between the selected lens and the focal surface, and a follow focus system including a first cam member affixed to said support means, a lever for following the movement of said first cam member, a second cam member, and a linking member for coupling said first and second cam members, said second cam member having a cam surface for each of the plurality of lenses for providing a follow focus movement corresponding to the selected lens incorporated with said system for projecting.

6. An image projection system as claimed in claim 5, wherein each of said cam surfaces is disposed a distance from the object to ensure that the image is substantially in focus upon the focal surface when the selected lens is incorporated within said system for projecting.

7. An image-projecting system as claimed in claim 6, wherein said distance is approximately equal to the focal length of the selected lens.

8. An image-projecting system as claimed in claim 7, wherein said support means includes a member which is selectively engageable with one of the cam surfaces.

9. Apparatus for projecting an image onto a focal surface, said apparatus including:
   a. lens means;
   b. means movably mounted with respect to said lens means for varying the long conjugate distance between said lens means and the focal surface;
   c. drive means for imparting a first displacement along a rectilinear path to said means for varying; and
   d. follow focus means responsive to the first displacement of said means for varying for imparting a second displacement as a nonlinear function of the first displacement to said lens means to maintain the image in focus upon the focal surface, said follow focus means including a cam member affixed to said means for varying and having a cam surface and a member rotatably mounted about an axis, said last mentioned member being biased to follow the movement of said cam surface, said surface including a straight line skewed with respect to said axis.

10. An image projection system as claimed in claim 9, wherein said straight line is so skewed with respect to said axis that the distance between said straight line and said axis decreases as a function of the distance from said lens means.